S. S. Gray.
Collar Machine.
No. 43,401. Patented July 5, 1864.
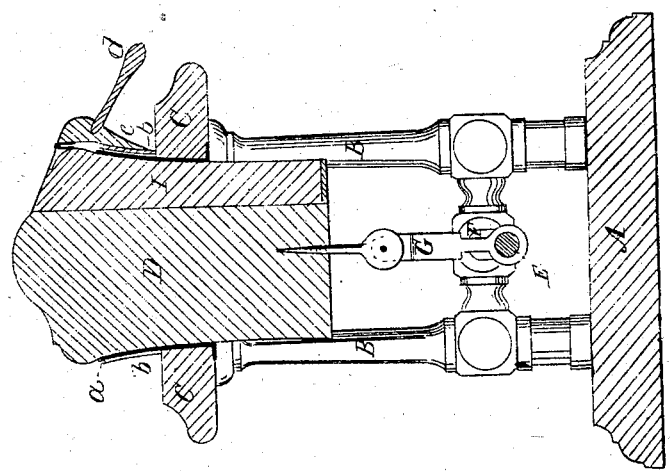
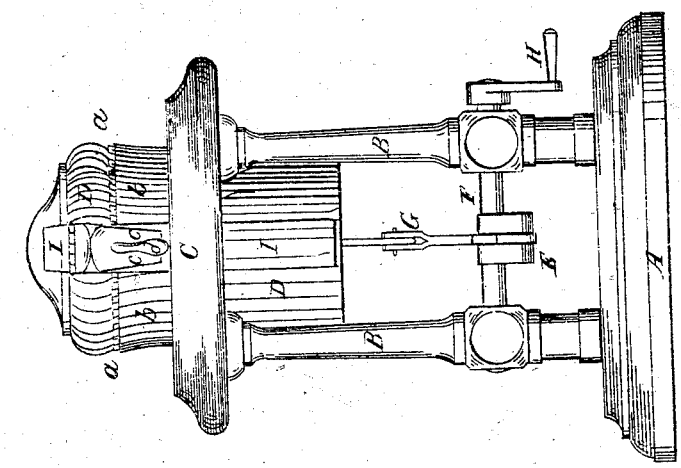

UNITED STATES PATENT OFFICE.

SOLOMON S. GRAY, OF BOSTON, MASSACHUSETTS.

IMPROVEMENT IN APPARATUS FOR FORMING COLLARS

Specification forming part of Letters Patent No. 43,401, dated July 5, 1864.

*To all whom it may concern:*

Be it known that I, SOLOMON S. GRAY, of Boston, in the county of Suffolk and State of Massachusetts, have invented a certain new and useful improvement in machinery for molding shirt-collars made of paper or other material of which pulp is an essential component; and I do hereby declare the following to be a full, clear, and exact description of the same, reference being had to the accompanying drawings, making a part of this specification, in which—

Figure 1 represents an elevation of the molding-machine, and Fig. 2 represents a vertical section through the same.

Similar letters of reference, where they occur in the separate figures, denote like parts of the machine in both of the drawings.

In making shirt-collars out of paper, or its equivalent, whether they be stand-up or turn-over collars, and whether they be made of one piece or of two or more pieces, they will not, without molding or stretching some portion thereof, or elongating one edge more than the other in some way or other, comfortably and neatly fit the neck of the wearer.

I have already patented—namely by patents dated 23d June, 1863; reissued 29th March, 1864; and 14th April, 1863, respectively—the plans of turning over a collar on a curved line, which practically lengthens one edge and prevents wrinkling, and also a stand-up collar molded at its top to make it stand out; and I have also applied for a patent for a shirt-collar molded at its lower edge or portion. But my present invention consists in a a machine for molding or stretching a paper, or a paper and cloth combined, shirt-collar, either to make it more accurately fit the neck of the wearer, or to make it capable of being turned over on a straight line without puckering or wrinkling.

To enable others skilled in the art to make and use my invention, I will proceed to describe the same with reference to the drawings.

A is a base upon which the uprights B are placed, sustaining upon their tops a horizontal piece, C, the center of which is open to allow a block, D, to move up and down through it. The margin of the circular opening through the piece C is furnished with a metal or other suitable ring, $a$, extending above the plane of the piece or table C, said extended portion being slotted, so that it may be expanded by the descent of the block or plunger D. Around this expansible ring $a$ there is a rubber band or ring, $b$, which will also expand with the inner ring and contract, and thus also contract the inner ring when the block or plunger is moved up, or a single ring may be made that will perform this function by common and obvious means. The block D is made somewhat conical at its upper portion, as seen in the drawings, and may be raised and lowered by the crank E on the crank-shaft F, and the pitman G, connecting the block or former D to said crank. The crank-shaft may be turned by a winch, H, or by belt and pulley, or any other well-known mechanical appliance for such purpose.

I is a stationary tongue-piece, it being secured to the table C, and a groove is made in the block, plunger, or former D, so that it may move past this tongue-piece. On the tongue-piece I there is a clamp, $c$, which has a handle, $d$, affixed to it, by means of which the two ends of the collar that is to be molded or stretched are caught and held while it is being acted upon by the former. This mode of holding the collar I find answers a good purpose; but it may be held by any other device, and the holding device may be on the table, or on the collar to be stretched, in which event the block or former may be uncut.

The operation of the machine is as follows: The paper strip being brought around against the rubber band $b$, its two ends overlap or meet against the tongue-piece I. The clamp $c$ is brought down to hold the ends of the strip firmly. The plunger or former D is now caused to descend, and in descending it forces outward the slotted or split ring $a$, and the interposed rubber band $b$ against the paper, or paper and cloth strip, and stretches or molds its edge, which causes the finished collar to nicely fit the neck of the user. If it be a stand-up collar, then the lower edge or part only need be stretched or molded. If, however, it be a turn-down collar, then the upper portion of the collar may be subjected to this stretching or molding process, so as to elongate the upper or fold over edge or part thereof, which will admit of the collar being turned over on a straight instead of a curved line, and yet avoid wrinkling even when a necktie is placed between the turned over portion and that not turned over. To mold the upper portion for a turn-over collar, the strip need only be placed around the band $b$, with that part which is to constitute the folded-over portion uppermost and the neck or band portion below. By this machine two important results are attained—first, a paper strip may be stretched upon either of its edges to mold or fit it to the neck of the wearer; and, secondly, the upper portion of a strip of paper may be stretched or elongated so that it may be turned-over on a straight line without wrinkling, and the turned-over portion stand off from the neck or band portion to admit a necktie between them.

The shape of the paper strip is immaterial, as when bent around the form or mold the upper line or portion will be most stretched, whether that portion is to constitute the neck portion or the turn-over portion of the finished article. By uppermost portion I mean that portion nearest the most expansible part of the rings $a$ $b$.

Having thus fully described my invention, what I claim as new, and desire to secure by Letters Patent, is—

1. The combination of the former D with the elastic band, or its equivalent, when operating substantially as herein described.

2. Holding the strip or collar by its two ends while the former is being forced into or through it to mold it to the desired form, substantially as described.

SOLOMON S. GRAY.

Witnesses:
A. B. STOUGHTON,
JAMES A. WOODBURY.